United States Patent
Mees van der Bijl et al.

(10) Patent No.: US 7,364,232 B2
(45) Date of Patent: Apr. 29, 2008

(54) RECLINING MECHANISM

(75) Inventors: Willem Mees van der Bijl, Enschede (NL); Rob Heinemeijer, Hengelo (NL); Johannes Hendrikus Rikhof, Beuningen (NL); Okke van Mourik, Utrecht (NL); Henk Vertegaal, Hengelo (NL); Sander Weernink, Enschede (NL)

(73) Assignee: HTS Hans Torgersen & Sønn AS, Krøderen (NO)

( * ) Notice: Subject to any disclaimer, the term of this patent is extended or adjusted under 35 U.S.C. 154(b) by 34 days.

(21) Appl. No.: 11/246,169

(22) Filed: Oct. 11, 2005

(65) Prior Publication Data

US 2006/0267388 A1 Nov. 30, 2006

(30) Foreign Application Priority Data

Apr. 29, 2005 (GB) ................... 0508854.7

(51) Int. Cl.
*A47D 1/10* (2006.01)

(52) U.S. Cl. .............. 297/256.1; 297/256.13; 297/250.1; 297/183.4

(58) Field of Classification Search ............ 297/250.1, 297/256.13, 256.1, 256.15, 183.1, 183.2, 297/183.4, 183.3
See application file for complete search history.

(56) References Cited

U.S. PATENT DOCUMENTS

| | | | | |
|---|---|---|---|---|
| 4,274,674 A | * | 6/1981 | Deloustal ............... | 297/256.13 |
| 4,688,850 A | * | 8/1987 | Brownlie et al. ........ | 297/270.2 |
| 5,143,419 A | * | 9/1992 | Tepper et al. ............ | 297/183.3 |
| 5,431,478 A | * | 7/1995 | Noonan ..................... | 297/130 |
| 5,803,535 A | | 9/1998 | Jane Cabagnero | |
| 6,145,927 A | * | 11/2000 | Lo ........................... | 297/250.1 |
| 6,986,518 B1 | * | 1/2006 | Besaw ........................ | 280/30 |
| 7,037,205 B1 | * | 5/2006 | Bowman .................... | 472/118 |

FOREIGN PATENT DOCUMENTS

| | | |
|---|---|---|
| EP | 0157880 | 3/1985 |
| EP | 0718145 | 6/1996 |
| EP | 1033280 | 9/2000 |
| EP | 1188605 | 3/2002 |

* cited by examiner

*Primary Examiner*—Sarah B. McPartlin
(74) *Attorney, Agent, or Firm*—Christian D. Abel

(57) ABSTRACT

Children's safety seat comprising two seat sections, preferably a sitting section and a back section, which connected to each other and an adjustable carrying handle connected to the safety seat. The carrying handle is arranged to be moved between various positions relative to the safety seat. Tthe movement of the carrying handle between the various positions causes a reposition preferably an angular displacement of at least one of the seat sections.

8 Claims, 3 Drawing Sheets

RECLINING MECHANISM

The invention concerns a children's safety seat.

The children's safety seat is especially suitable for small children belonging to the group 0+. The term 0+ is used to categorize children having a body weight up to 13 kg.

The children's safety seat in accordance with the invention is provided to be used both inside the vehicle, wherein the vehicles safety seat belt may be used to fasten the safety seat in the vehicle, and outside the vehicle, wherein the children's safety seat may be adjusted between various positions including a position suitable for carrying the children's safety seat and a reclined, flat position suitable for a resting children's.

Prior art describe several adjustable children's safety seats such as EP 718145, EP 157880 and EP 1033280. U.S. Pat. Nos. 4,637,653 and 4,655,503 disclose adjustable seats. EP 1188605 describes the use of the carrying handle to support the safety seat.

The object of the invention is to provide a solution which simplifies the adjustment of the children's safety between the various positions. This object is obtained by an inventive concept wherein the turning of the carrying handle is used to control the adjustment of the children's safety seat as defined in the characterizing part of the independent claim 1. Further embodiments of the invention are defined in the dependent claims.

The object of the invention is to provide a solution which simplifies the adjustment of the children's safety between the various positions. This object is obtained by an inventive concept wherein the turning of the carrying handle is used to control the adjustment of the children's safety seat.

In one position suitable for a baby to be carried in the children's safety seat the carrying handle is placed upright and the corresponding arrangement of the seat sections is upright. In another position suitable for the baby to be resting for longer periods outside the vehicle the carrying handle is turned towards either of the seat sections, preferably the back section, the seat sections are then in a reclined position providing an almost flat surface for the baby to be resting outside the vehicle. When the children's safety seat is to be placed in the vehicle the carrying handle is turned towards either of the seat sections, preferably the sitting section. The corresponding arrangement of the seat sections is upright. When the children's safety seat is placed in a backward facing position in the vehicle, the carrying handle is pressed against the passenger seat of the vehicle and provides protection during a possible crash.

In accordance with a preferred embodiment of the invention either the sitting section or the back section or both sections are arranged for angular displacement. The turning of the carrying handle causes a change in the angular arrangement of at least one of the sections. If only one of the sections is to be repositioned the other seat section is to be arranged fixed preferably to the base of the children's safety seat. The carrying handle and the two seat sections may be joined together using one pivot connection In accordance with a first and a second embodiment of the invention the sitting section and the back section are adjustable connected to each other, preferably the seat section is articulated connected to the back section by suitable articulating means. The articulating means may be constituted by a link arrangement of some kind.

In the first embodiment the link arrangement comprises a first link arm, a second link arm and a third link arm. The first link arm has a first end pivotally connected to the sitting section and the first end of the second link arm is pivotally connected to the back section. The third link arm has a first end pivotally connected to the carrying handle. A connecting area between the first, second and third link arm is constituted by the second end of the first link arm, the second end of the second link arm and the second end of the third link arm being pivotally connected. The pivot connections are provided by any suitable means making the link arms able to pivot relative to each other and the seat sections. When the carrying handle is turned between the various positions the link arms in the link arrangement are rearranged and one of the seat section is subsequently displaced angularly to obtain the corresponding position of the children's safety seat. See figure description for a more detailed explanation of this embodiment.

In the second embodiment the link arrangement comprises a first link arm and a second link arm. The first link arm has a first end pivotally connected to the sitting section and the first end of the second link arm is pivotally connected to the back section. A connecting area between the first and the second link arm is constituted by the second end of the first link arm being pivotally connected to the second end the second link arm. The pivot connections are provided by any suitable means making the link arms able to pivot relative to each other and the seat sections.

The carrying handle is provided with a control structure, wherein the position of the control structure is determined by the position of the carrying handle. The positions of the control structure include a first position where the control structure is placed into an abutting contact with the connecting area of the first and second link arm, and a second position where the control structure is brought out of engagement with the connecting area. By bringing the control structure from one position to the other at least one of the seat sections is repositioned preferably reoriented angularly, and the children's safety seat is brought into a different position.

In a third embodiment of the invention the two seat sections are pivotally connected forming a connecting area. The children's safety seat is provided with a frame. One of the seat sections, preferably the sitting section is displaceably connected the frame. Thee other seat section, preferably the back section, is pivotally connected to the frame.

The sitting section may be displaceably connected by a sliding guidance which comprises at least a recess and a least a sliding element, wherein at least a portion of each sliding element is positioned to be moved in the recess.

In accordance with the third embodiment of the invention the carrying handle is provided with a control structure, wherein the position of the control structure is determined by the position of the carrying handle. The positions of the control structure include a first position where the control structure is placed into an abutting contact with the connecting area of the first and second seat sections, and a second position where the control structure is brought out of engagement with the connecting area. By bringing the control structure from one position to the other at the seat sections are repositioned preferably reoriented angularly, and the children's safety seat is brought into a different position.

The children's safety seat may be provided with locking means or other arrangement to make sure that the components of the children's safety seat is held within the position chosen by the carrying handle. When changing the position of the children's safety seat the locking means must be unlocked, whereafter the new position is chosen and then children's safety seat is locked in the current position. The children's safety seat may be provided with arrangements alternative to the mentioned locking means, the children's safety seat may for instance be provided so that an automatic locking is achieved when the components of the children's safety seat in the various positions.

The children's safety seat may be provided with indicators signalling to the user the area of use corresponding to the current position of the safety seat. Such as carrying position, sleeping position, car position.

In the following several embodiments of the invention will be described, by way of example, with reference to accompanying drawings, in which.

Figure 1:
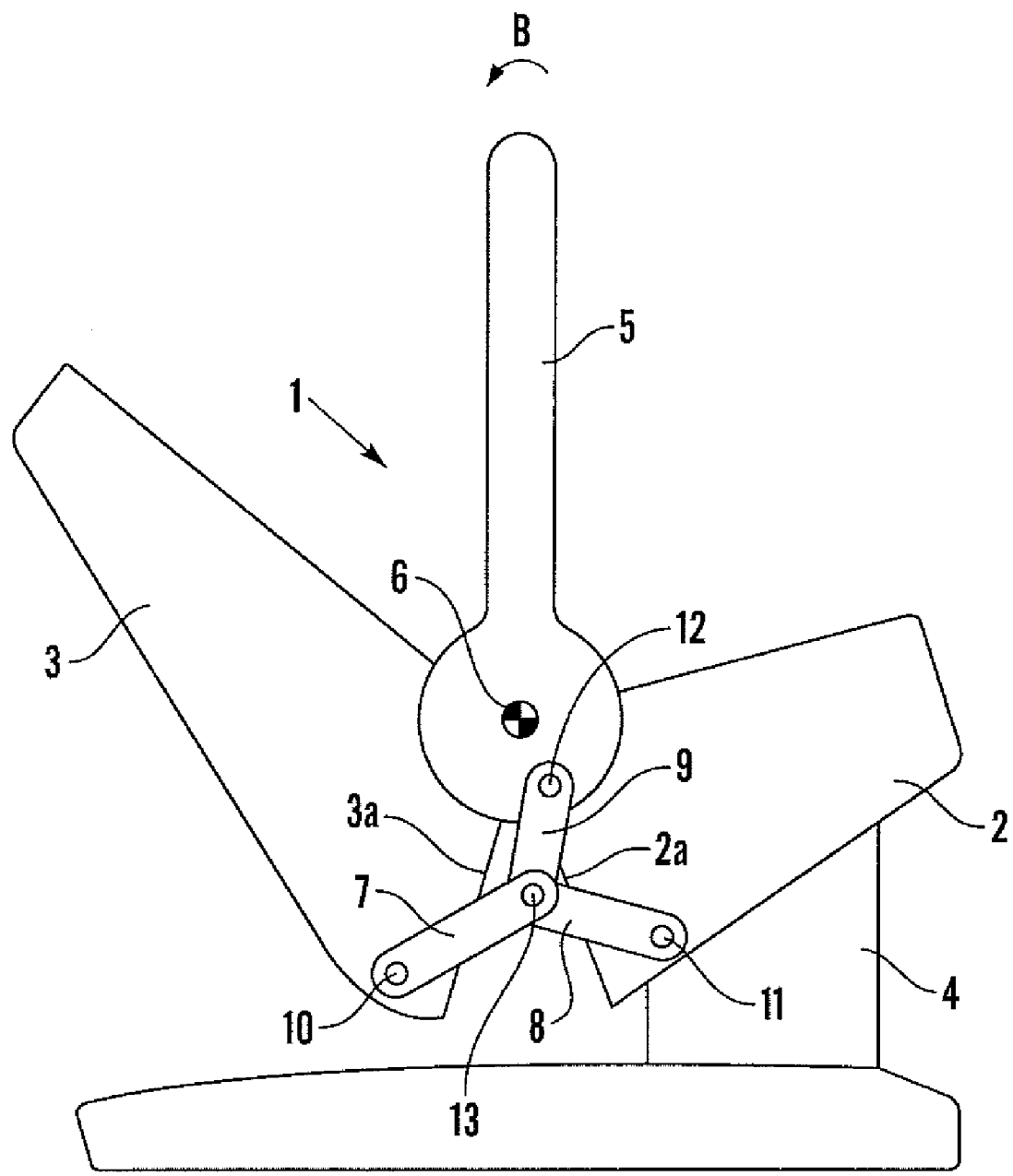
FIG. 1 illustrates a side view of a first embodiment of the invention.

FIG. 1 illustrates a preferred embodiment of a children's safety seat 1 shown in an upright position. The children's safety seat 1 comprises a sitting section 2 and a back section 3. The sitting section 2 is fixed to a base 4. A carrying handle 5 for adjusting the angle between the sitting section 2 and the back section 3 is connected to the sections 2, 3 by a pivot connection 6. The pivot connection 6 thereby provide the pivot axis of the back section 3 and the carrying handle 5. In this embodiment a link arrangement comprising three arm links; first arm link 7, second arm link 8, and third arm link 9 is provided. Each arm link has a first end pivotally connected by suitable first fixing means 10, second fixing means 11 and third fixing means 12 to the back section 3, sitting section 2 and the carrying handle 5 respectively. The second ends of the arm links 7, 8, 9 are pivotally interconnected by suitable fourth fixing means 13.

Figure 2A:
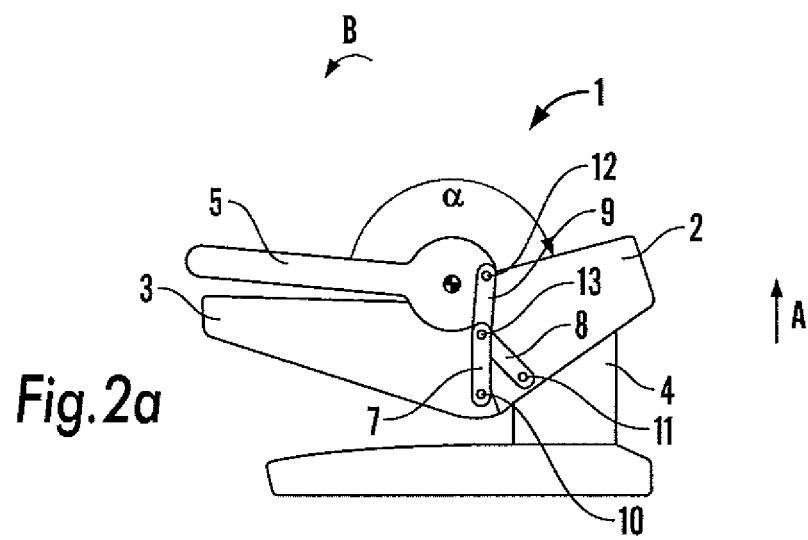
FIG. 2a-2c illustrates side views of the first of a first embodiment of the invention.

FIG. 2a shows the safety seat 1 placed in a flat/reclined position. Starting from FIG. 1 the carrying handle 5 is turned in the direction towards the back section 3(illustrated by arrow B). This movement of the carrying handle 5 causes the third arm link 9 and the third and fourth fixing means 12, 13 to shift upwards as illustrated by the arrow A. The first arm link 7 is thereby made to pivot about the first and fourth fixing means 10 and 13, whereas the second arm link 8 pivots about the second and third fixing means 11 and 13. By these movements of the arm links 7, 8, 9 a pulling force is exerted onto the back section 3 by first fixing means 10. The back section 3 is thereby caused to pivot about the pivot connection 6 and placed with a side surface 3a abutting a side surface 2a of the sitting section 2. The safety seat is then brought into a reclined or flat position suitable for the support of the children's outside the vehicle. The angular displacement of the back section 3 is illustrated by the angle α between the sitting section 2 and the back section 3.

Figure 2B:
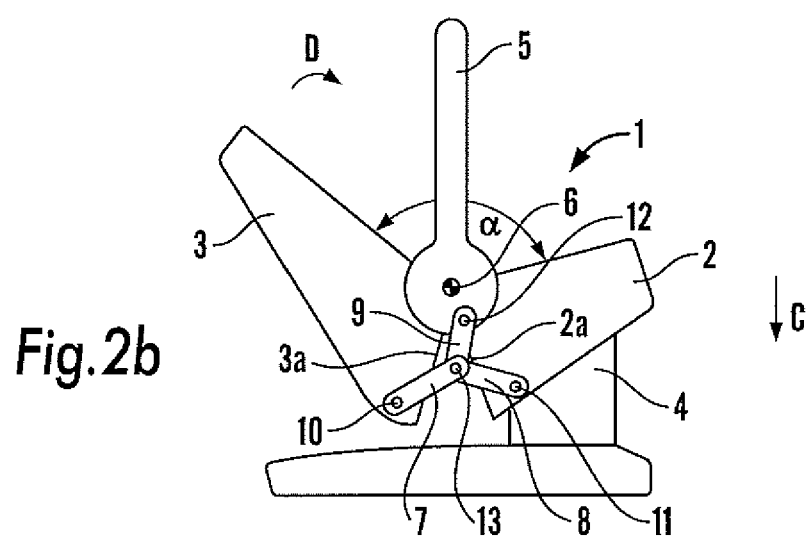

FIG. 2b shows the safety seat 1 placed in an upright position suitable for carrying the children's outside the vehicle. The carrying handle 5 is turned from the position shown in FIG. 2a to the upright position shown in FIG. 2b (illustrated by arrow D). The movement of the carrying handle 5 causes the third arm link 9 and the fourth fixing means 13 to shift downwards as illustrated by the arrow C, thereby transferring the shifting movement to the back section 3 via the pivoting movement of the first arm link 7 around first and fourth fixing means. The second arm link 8 is connected to the fixed seat section 2 and supports the transfer of movement wherein the second arm link 8 is pivoted about the second and third fixing means 11 and 13 during the transferring movement. Consequently the back section 3 is forced to pivot about the pivot connection 6, thereby bringing the side surface 3a away from abutment with the side surface 2a, and the angle α between the sitting section 2 and the back section 3 has been changed.

Figure 2C:
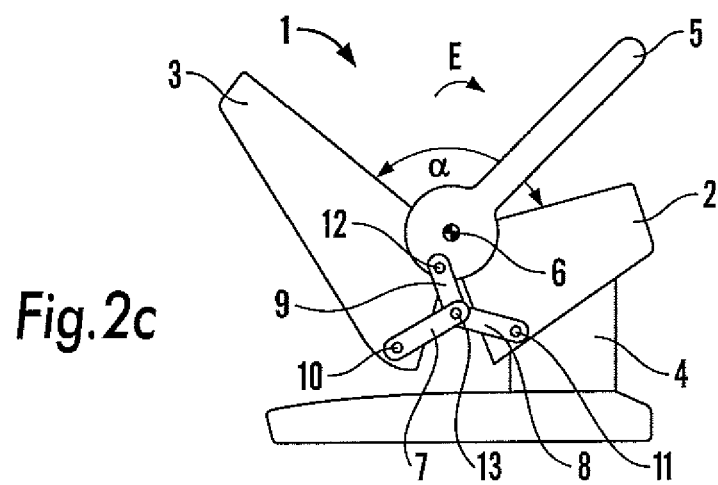

Turning the carrying handle 5 from the position shown in FIG. 2b (illustrated by arrow E) towards the sitting seat to the position shown in FIG. 2c, causes the third arm link 9 pivot about third and fourth fixing means. During the movement of the carrying handle the third arm link 9 is caused to shift somewhat and consequently the back section 3 also experiences a small pivoting movement preferably a movement wherein the angle α initially is increased and thereafter reduced, thereby bringing the back section into a position a little bit different from the one shown in FIG. 2b. FIG. 2c shows the safety seat with the carrying handle in a position wherein the safety belt is tensioned and the carrying handle provides support against the passenger seat.

Figure 3:
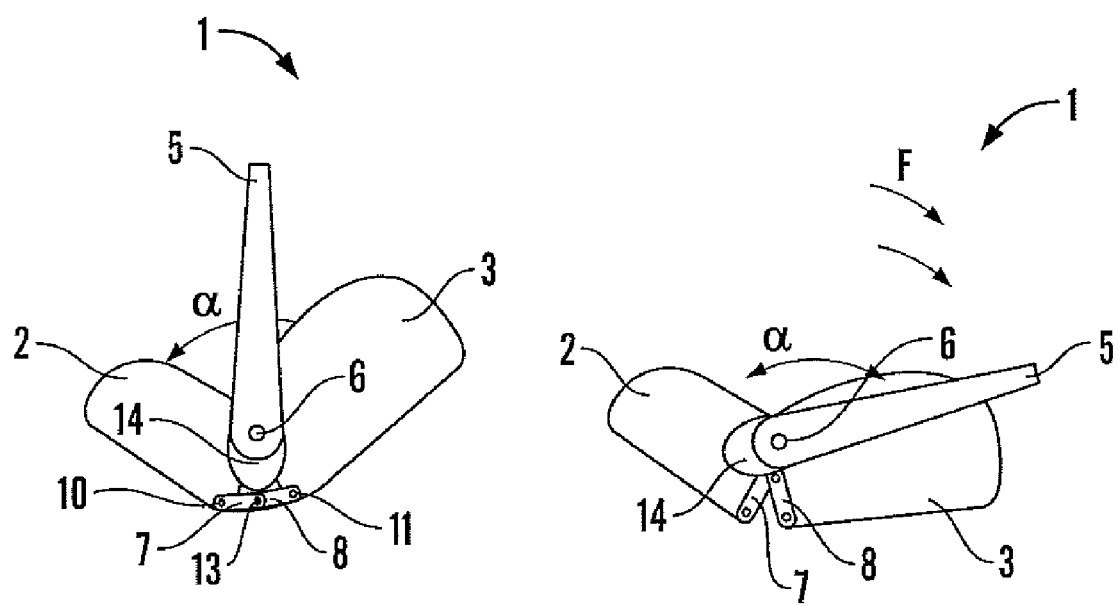
FIG. 3 illustrates a side view of a second embodiment of the invention.

In the second embodiment shown in FIG. 3, the sitting section 2, the back section 3 and the carrying handle 5 are interconnected by a pivot joint 6. The sitting section 2 is fixed by suitable means(not shown), while the back section 3 is arranged to pivot about the pivot axis established by the pivot joint 6 in accordance with the turning of the carrying handle 5. A link arrangement comprising a first arm link 7 and a second arm link 8 is provided. The first link arm 7 has a first end pivotally connected to the sitting section 2 by first fixing means 10 and the second end pivotally interconnected to the second end of a second link arm 8 by third fixing means 13. Further, the first end of the second link arm 8 is pivotally connected to the back section 3 by second fixing means 11. The end of the carrying handle 5 is provided with a control structure 14 which is shaped as a half-circular element in FIG. 3. When the carrying handle is arranged in an upright position as shown in the left illustration in FIG. 3, the control structure 14 is abutting against the link arrangement in the area where the first arm link 7 and the second arm link 8 are interconnected, exerting a holding force onto this area and keeping the first arm link 7 and the second arm link 8 in line. In this position the children's safety seat 1 is arranged in the carrying position. When the carrying handle 5 is turned about the pivot joint 6 in the direction as illustrated by the arrow F in the right illustration, the control structure is moved away from the interconnection between the first arm link 7 and the second arm link 8. The arm links 7, 8 are then free to rotate about the third fixing means and first and second fixing means respectively as the back section 3 pivots about the pivot joint 6 towards the sitting section 2. The angular displacement of the back section 3 is illustrated by the angle α between the sitting section 2 and the back section 3. The safety seat is brought to an inclined position by this movement. By turning the carrying handle 5 back to the upright position the children's safety seat is returned to the position as shown in left illustration.

The invention claimed is:

1. Children's safety seat comprising two seat sections, a sitting section and a back section, which are adjustably connected to each other by a link arrangement comprising a first link arm having a first end pivotally connected to the sitting section and a second end pivotally connected to a second end of a second link arm forming a connecting area, and wherein a first end of the second link arm is pivotally connected to the back section, the seat further comprising an adjustable carrying handle connected to the safety seat, which carrying handle is arranged to be moved between various positions relative to the safety seat, such that movement of the carrying handle between the various positions causes a repositioning of at least one of the seat sections.

2. Children's safety seat according to claim 1, wherein the carrying handle is pivotally connected to the children's seat.

3. Children's safety seat according to claim 2, wherein the repositioning is an angular displacement.

4. Children's safety seat according to claim 3, wherein the two seat sections are joined together using a pivot connection and the carrying handle is connected to the same pivot connection.

5. Children's safety seat according to claim 4, wherein one of the seat sections is fixed to a base of the safety seat.

6. Children's safety seat according to any of claims 1-4 wherein the carrying handle is operatively connected to the link arrangement by a third link arm, a first end of which is connected to the carrying handle and a second end of which is connected to the first and second link arms at the connecting area.

7. Children's safety seat according to any of claims 1-4, wherein the carrying handle is provided with a control structure arranged to operatively engage the link arrangement, and wherein the position of the control structure is determined by the position of the carrying handle.

8. Children's safety seat according to claim 7, wherein the positions of the control structure include a first position where the control structure abuts against the connecting area causing the safety seat to achieve a sifting configuration, and a second position where the control structure is free from the connecting area, allowing the safety seat to be adjusted into a reclining position.

* * * * *